United States Patent [19]

Lehtinen et al.

[11] Patent Number: 5,061,853

[45] Date of Patent: * Oct. 29, 1991

[54] SAMPLE PLATE LIQUID SCINTILLATION COUNTER

[75] Inventors: Kauko Lehtinen, Raisio; Tapio Yrjönen; Vesa Sonne, both of Turku, all of Finland

[73] Assignee: Wallac OY, Turku, Finland

[ * ] Notice: The portion of the term of this patent subsequent to Jun. 12, 2007 has been disclaimed.

[21] Appl. No.: 460,198

[22] PCT Filed: Feb. 1, 1989

[86] PCT No.: PCT/SE89/00353

§ 371 Date: Feb. 10, 1989

§ 102(e) Date: Feb. 10, 1989

[87] PCT Pub. No.: WO89/12838

PCT Pub. Date: Dec. 28, 1989

[30] Foreign Application Priority Data

Jun. 17, 1988 [SE] Sweden .................................. 8802282

[51] Int. Cl.⁵ ............................................. G01T 1/204

[52] U.S. Cl. .................................. 250/328; 250/364; 250/368

[58] Field of Search ............ 250/328, 364, 368, 361 C

[56] References Cited

U.S. PATENT DOCUMENTS

| | | | |
|---|---|---|---|
| 3,898,460 | 8/1975 | Noakes et al. | 250/328 |
| 4,298,796 | 11/1981 | Warner et al. | 250/328 |
| 4,659,222 | 4/1987 | Ekholm | 356/244 |
| 4,933,554 | 6/1990 | Lehtinen et al. | 250/328 |

FOREIGN PATENT DOCUMENTS 2167279  5/1986  United Kingdom .

Primary Examiner—Carolyn E. Fields
Attorney, Agent, or Firm—Fred Philpitt

[57] ABSTRACT

An arrangement for improving the counting of liquid scintillation samples including a plurality of separate sample wells, a plate holder surrounding the sides of each sample well so that each plate holder forms an optically separate compartment for each sample well, at least one photomultiplier tube adjacent each sample well, and a coating of light reflective or light scattering material on the inner surfaces of said plate holders.

6 Claims, 3 Drawing Sheets

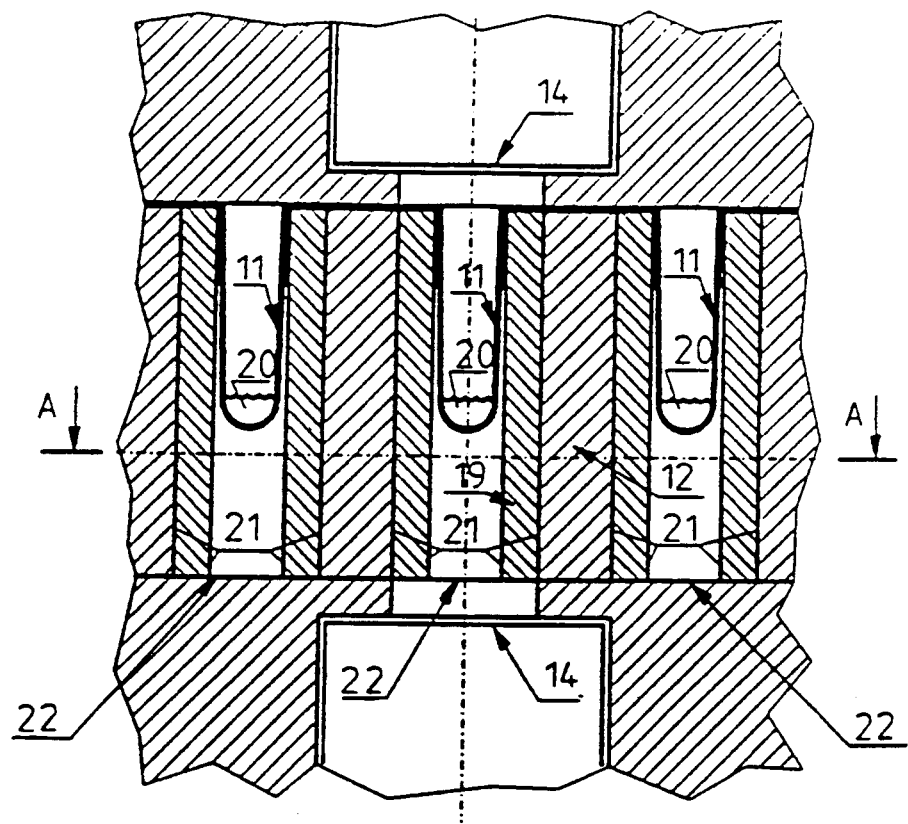
Fig. 3a
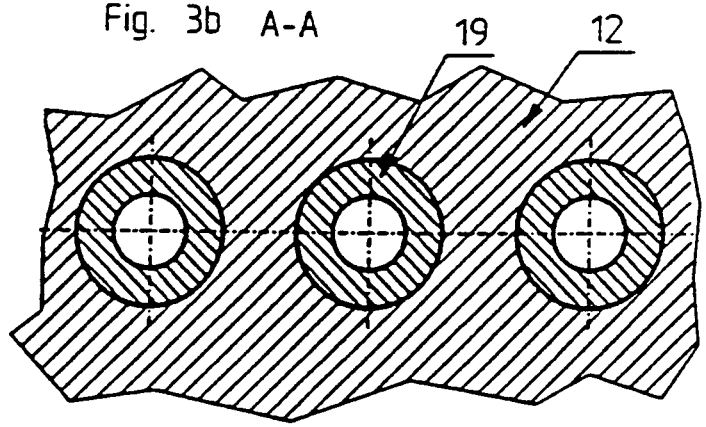
Fig. 3b A-A

SAMPLE PLATE LIQUID SCINTILLATION COUNTER

BACKGROUND OF THE INVENTION

Liquid scintillation counters are mainly used for measuring low energy beta radiation emitting samples, which are of, for example, biological or medical interest. The conventional liquid scintillation counters are designed to count samples which are in the sample vials with the scintillation liquid. The volume of the sample vial is typically 6 or 20 milliliters. The sample vials are placed into sample racks, which have separate compartments for individual sample vials. The sample racks are placed on the conveyor of the automatic sample changer system of the counter.

Because the above mentioned liquid scintillation counter is designed to count vials whose volume is up to 20 milliliters, serious difficulties are encountered when the sample volume is a only few hundred microliters or less. Typically, these kind of samples are prepared in small vials, which are inserted into normal vials. In addition, the handling of separate sample vials is very time consuming and includes potential risk of setting the sample vials in incorrect order into the sample racks. The sample changing mechanism of such an instrument is also rather complicated, because the vial must be removed from the sample rack and must be positioned into a light tight radiation detection chamber, and after counting it must be returned back into the sample rack.

In addition to the above mentioned conventional liquid scintillation counters, one special purpose liquid scintillation counter exists, namely 1205 Betaplate, which is manufactured by Wallac Oy, Finland. This instrument is designed to count liquid scintillation samples directly from a filter mat, which is sealed into a plastic bag with a small amount of scintillation liquid. On the same filter mat there can be up to 96 samples, and six samples are counted at a time.

SUMMARY OF THE INVENTION

The present invention shows a new apparatus which counts liquid scintillation or corresponding samples directly from the sample plates which comprise several separate sample wells or vials. A typical plate of this kind is produced by a vacuum thermoforming process (deep drawing) from transparent material) and has eight rows of wells arranged in twelve columns. The typical volume of the sample wells of such a 96-well sample plate is 200–400 microliters. Another type of plate has four rows of wells arranged in six columns. The volume of the wells of such a 24-well sample plate exceeds one milliliter. In addition, sample plates with two rows of wells arranged in three columns are available. The volume of the wells of such a 6-well sample plate is about 10 milliliters. Thus the apparatus according to the present invention is designed to count samples (including liquid scintillant), the volume of which is from a few microliters up to ten milliliters.

BRIEF DESCRIPTION OF THE DRAWINGS

The apparatus according to the present invention will be described in detail with reference to the attached drawings, wherein

FIG. 3a shows a vertical section of the counting conditions, where the plate holder is equipped with gamma radiation sensitive detectors.

FIG. 3b shows a section along the line A—A in FIG. 3a.

DESCRIPTION OF THE PREFERRED EMBODIMENTS

Figure 1:
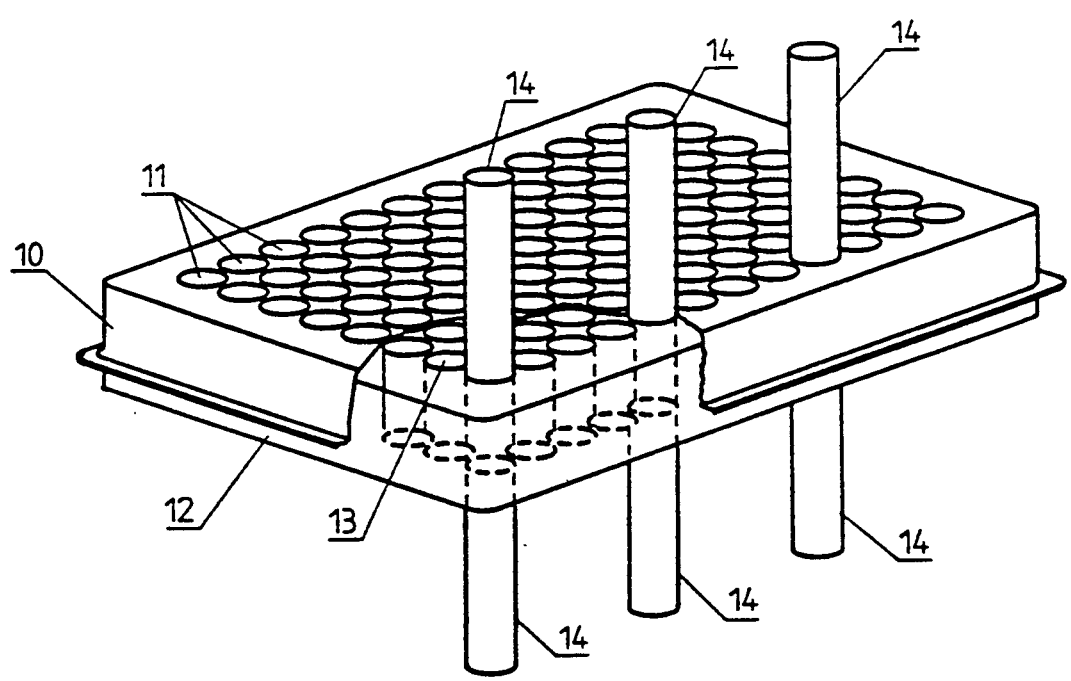
FIG. 1 is a perspective view showing the general principle of the apparatus according to the present invention.

In FIG. 1 a sample plate (10), which has several sample wells (11), is placed in the counting position or before the counting position manually or automatically on a rigid plate holder (12) made of photon attenuating material and having holes (13) for the wells of the sample plate. In order to count one or several samples at a time, the apparatus has one or several detectors, built of two photomultiplier tubes (14) working in cooperation and are situated on the opposite sides of the plate holder (12). The apparatus has a mechanism, (which is not shown here), which presses said photomultiplier tubes in the down position tightly against said sample plate in order to form an optically closed system with the sample plate well (11) and allows in the up position free horizontal movement of said sample plate.

The plate holder (12) can be a separate part or it can be fixed with the photomultiplier tubes (14) which are beneath the sample plate (10). In this case the plate holder (12) needs to surround only those sample plate wells (11) which are at that time in the counting position defined by the photomultiplier tube pairs (14).

Figure 2:
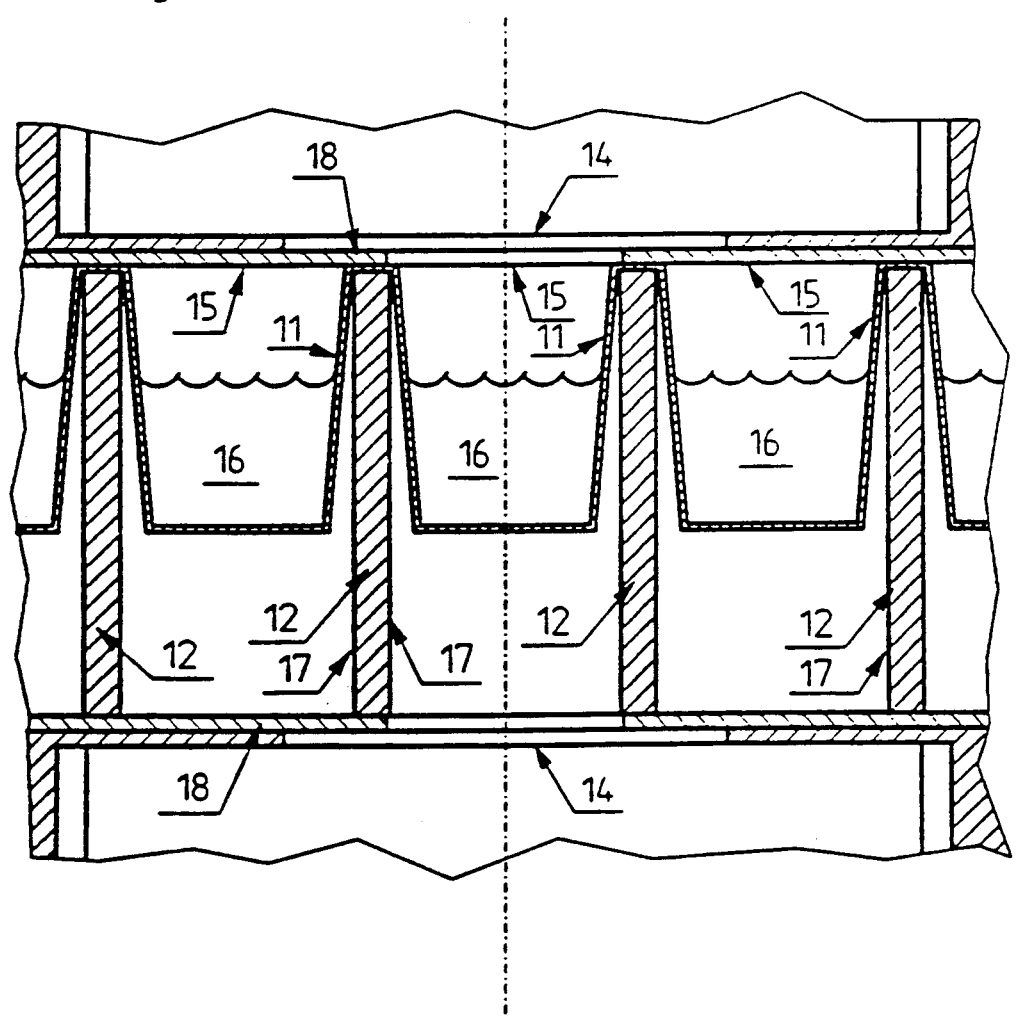
FIG. 2 shows a vertical section of the counting conditions.

FIG. 2 shows a vertical section of the counting conditions. The wells (11) of the sample plate are closed by a transparent adhesive tape (15). The plate holder (12) has three different functions: 1) to be a rigid support for the flexible sample plate (10), 2) to separate optically the different sample wells (11) of the sample plate and thus to make it possible to count samples directly from sample wells without cross talk between the samples and 3) to guide the photons from the liquid scintillation sample (16) to the photomultiplier tubes (14). Thus the material of the plate holder (12) must reflect or scatter light or the walls of the holes must be coated by reflecting or scattering material (17). The apparatus has in the front of the photomultiplier tubes changeable plates (18) for the different sample well diameters of the 96, 24 or 6 well sample plates.

FIGS. 3a and 3b show that the apparatus according to the present invention can be used also for counting gamma radiation emitting samples (20). The sample plate (10) with separate sample wells or vials (11), is placed in the counting position or before the counting position manually or automatically in a plate holder (12), whose holes are surrounded by gamma radiation sensitive detectors (19). The body (12) of the sample holder can be made of material which absorbs gamma radiation as much as possible. The walls (21) of the cylindrical gamma sensitive detectors (19) are reflecting so that the photons originating from the scintillation process followed by the absorption of the gamma radiation are guided to the photomultiplier tube pair (14) working in cooperation and situated on the opposite sides of the holes of the plate holder (12). Instead of the detectors comprising two photomultiplier tubes, also one photomultiplier tube is also possible. In this case there is a reflecting surface (22) in the bottom end of the cylindrical gamma sensitive detectors (19) in order to reflect photons towards the photomultiplier tube.

The invention is not confined to the above embodiments, but encompasses all apparatus within the scope of the patent claims.

What is claimed is:

1. An arrangement for improving the counting of liquid scintillation samples comprising in combination
   (a) a plurality of separate sample wells (11),
   (b) a holder (12) surrounding the sides of each sample well (11) so that each holder (12) forms an optically separate compartment for each sample well (11),
   (c) photomultiplier tubes (14) positioned above and below each sample well (11), and
   (d) a coating of light reflective or light scattering material (17) on the inner surfaces of the holders (12).

2. An arrangement according to claim 1 wherein the tops of the sample wells (11) are closed by transparent adhesive tape (15).

3. An arrangement according to claim 1 wherein said holders (12) are each surrounded by a gamma radiation sensitive detector (19).

4. An arrangement for improving the counting of liquid scintillation samples comprising in combination
   (a) a sample plate containing a plurality of separate sample wells (11),
   (b) a holder (12) surrounding the sides of each sample well (11) so that each holder (12) forms an optically separate compartment for each sample well (11),
   (c) a photomultiplier tube (14) positioned above each sample well (11) and a reflecting surface (22) positioned below each sample well (11) to reflect photons toward the photomultiplier tube, and
   (d) a coating of light reflective or light scattering material (17) on the inner surfaces of the holders (12).

5. An arrangement according to claim 4 wherein said tops of the sample wells (11) are closed by transparent adhesive tape (15).

6. An arrangement according to claim 4 wherein the holders (12) are each surrounded by a gamma radiation sensitive detector (19).

* * * * *